United States Patent [19]
Biessener

[11] 3,797,406
[45] Mar. 19, 1974

[54] TOW LINE TRUCK AND BRAKE SYSTEM

[75] Inventor: Richard M. Biessener, Faribault, Minn.

[73] Assignee: Nutting Truck and Caster Company, Faribault, Minn.

[22] Filed: Feb. 2, 1972

[21] Appl. No.: 222,799

[52] U.S. Cl............... 104/172 BT, 180/92, 188/4, 293/7
[51] Int. Cl............................................ B61c 11/00
[58] Field of Search ................. 180/92, 93; 293/7; 104/172, 172 BT; 188/4

[56] References Cited
UNITED STATES PATENTS

| | | | |
|---|---|---|---|
| 3,625,313 | 12/1971 | Lowrie | 188/4 R |
| 3,415,200 | 12/1968 | Bishop et al. | 104/172 BT |
| 1,164,569 | 12/1915 | Bennett | 293/7 |
| 3,495,547 | 2/1970 | Bishop | 104/172 BT |
| 3,503,338 | 3/1970 | Klamp | 104/172 BT |
| 3,103,895 | 9/1963 | Bradt et al. | 104/172 BT |
| 2,619,370 | 11/1952 | Leger | 293/8 |

FOREIGN PATENTS OR APPLICATIONS

| | | | |
|---|---|---|---|
| 1,277,413 | 10/1961 | France | 104/172 BT |

Primary Examiner—Robert G. Sheridan
Assistant Examiner—Richard A. Bertsch

[57] ABSTRACT

A truck for tow line use is provided with an improved brake system designed to stop the truck in response to engagement of a front bumper of the truck against an obstacle, while minimizing the force applied by the truck and bumper to the obstacle. The truck includes at least one brake member having a bottom floor-engageable surface and an upper wheel-engageable surface, with brake support means on the truck which supports the brake member in front of at least one of the wheels for relative movement between a retracted position ahead of the wheel and a braking position in which the brake member is engaged beneath the wheel. The brake support means includes a relatively light longitudinally movable brake support member, and the front bumper is movably mounted thereon rather than directly on the truck itself. Control means responsive to engagement of the front bumper with an obstacle stops the forward movement of only the brake and its support member. Thus the wheel runs onto the brake member with a resulting cessation of forward motion due to the action of the brake member and weight of the truck, rather than the resistance of the obstacle. An anti-back-up device prevents premature rearward movement of the wheel and truck from the brake member. The truck also includes means for releasing the anti-back-up device.

17 Claims, 8 Drawing Figures

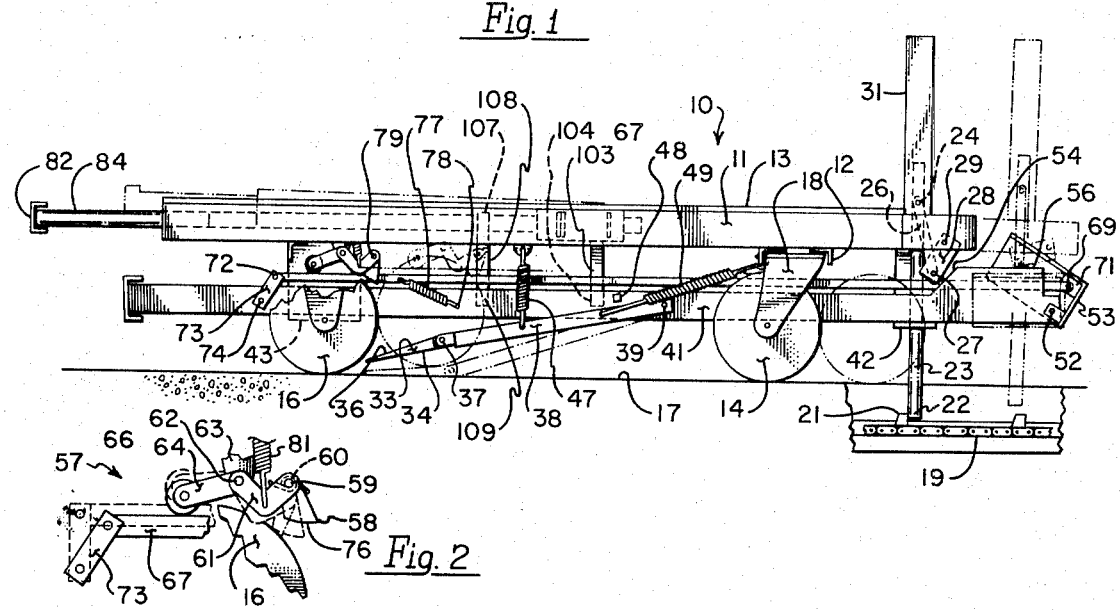
Fig. 1
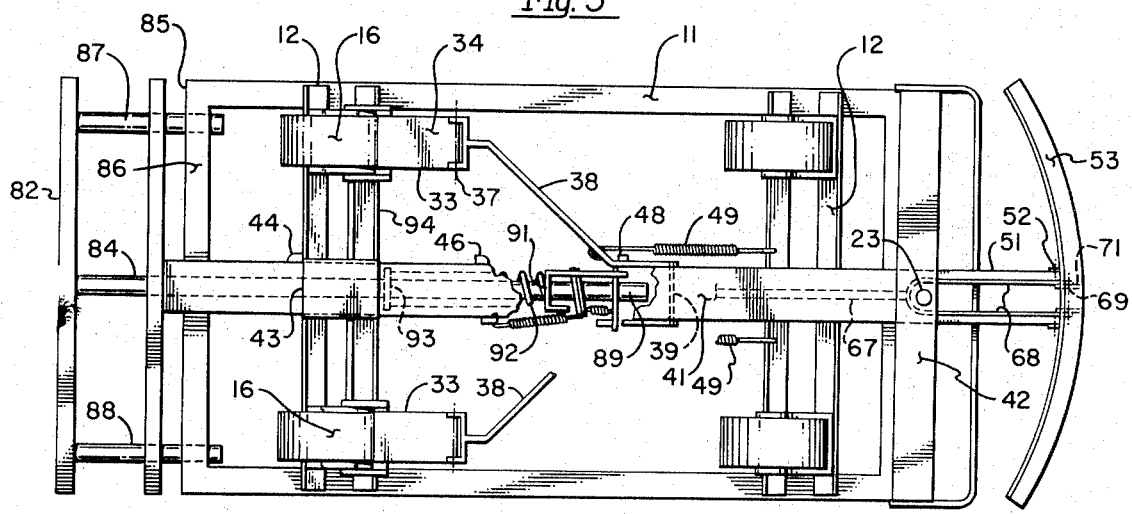
Fig. 2
Fig. 3

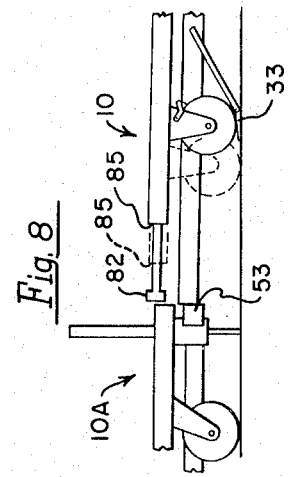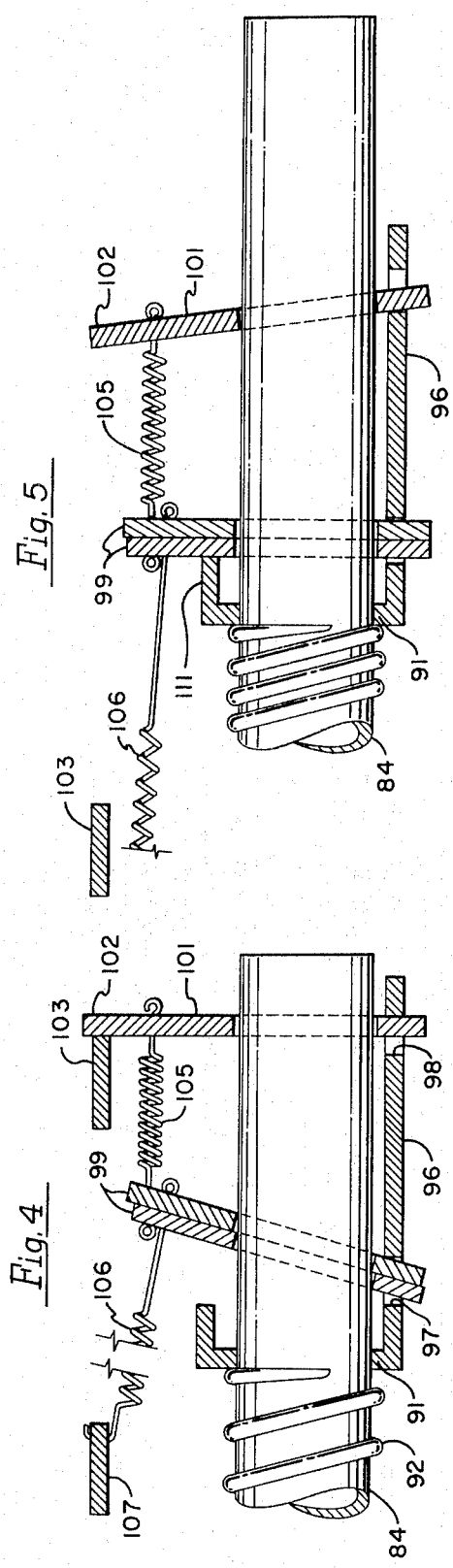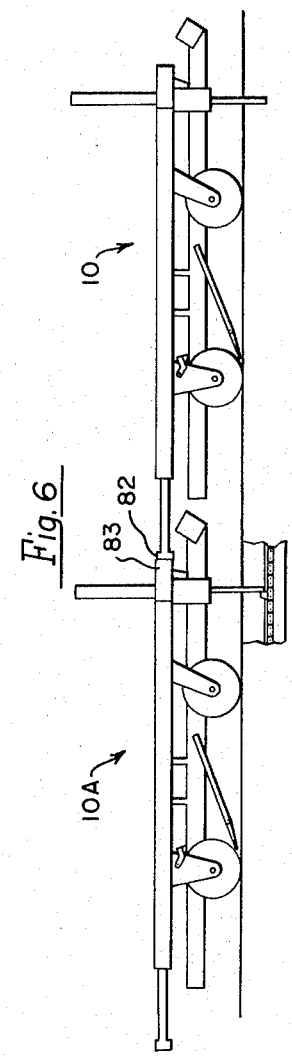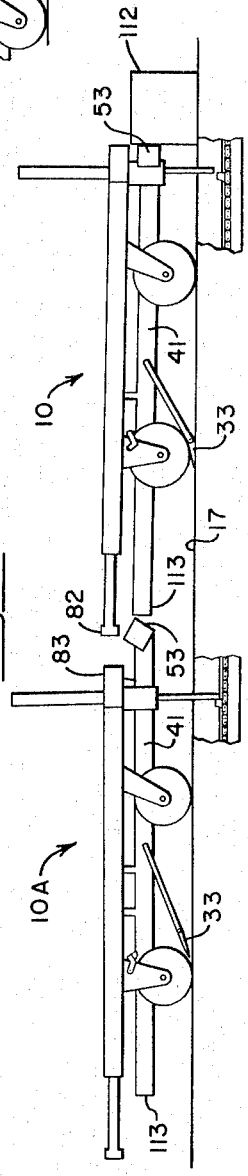

TOW LINE TRUCK AND BRAKE SYSTEM

BACKGROUND OF THE INVENTION

Tow line conveyor trucks are known in which a movable front bumper is designed to engage an obstacle or another truck ahead of the truck in question for movement of such front bumper to a position in which it effectively disengages the truck from driving connection with the usual tow line conveyor. When such a tow pin is disengaged, however, the momentum of a truck tends to continue its forward movement against the obstacle, with resulting possibilities of severe damage, depending on the nature of the obstacle. Some of the prior constructions also provide brake members adapted to engage one or more of the wheels of such a truck in an effort to stop the truck more effectively. Truck constructions have also been provided in which various arrangements of fixed and/or movable bumper members at various points on such a truck are designed to insure disengagement of the tow pin of a following truck when it encounters a leading truck which has been halted an obstacle, but in which the tow pin of the following truck remains in engagement with a driving conveyor when there is no obstacle in front of the leading truck and the engagement of the two trucks is designed merely to push the leading truck out of the main conveyor path and onto a suitable shunt or auxiliary conveyor line. As noted, however, the forces transmitted to an obstacle, before such a system of trucks can be brought to a halt, are very substantial. Also, known brake constructions which rely primarily on resilient or camming engagement of a movable brake member with the periphery of the truck wheel tend to be inadequate to insure complete stopping of the truck without substantial over-running of the obstacle. The frictional braking forces available for stopping such a truck are limited by the force with which the brake member can be applied to the wheel and by the coefficient of friction between the wheel periphery and either the brake member or the floor. Moreover, the braking force is applied largely by the object struck.

SUMMARY OF THE INVENTION

The present invention accordingly provides an effective truck and brake system in which the momentum of the truck is used to apply the brakes by permitting substantial relative longitudinal movement between a front bumper, which first engages an obstacle, and the main body portion, wheels and load of the truck itself. In effect, the obstacle can stop the bumper and a light brake support assembly in a shorter distance than it could stop a heavily loaded truck body. Continuing movement of the truck effectively operates the brake system before the forward portion of the truck itself has reached the obstacle.

Moreover, the weight of the truck and its load are utilized to dissipate the energy of movement of the truck by providing a preferred form of brake member having a braking position beneath a truck wheel, so that the truck wheel must move up onto the top of the brake member and firmly engage the brake member between the truck wheel and the floor on which the truck is adapted to move. Thus the frictional forces applied between the wheel, brake member and floor are proportional to the vertical force applied by the weight of the truck and load. Moreover, by providing a forwardly and upwardly inclined brake member, on to which the truck wheel is to run, the resulting vertical movement of the wheel, truck and load contributes to a more effective dissipation of the energy of foward movement of the truck and tends to stop the truck in a shorter distance, i.e., before the truck itself actually reaches the obstacle which has been engaged initially by the movable front bumper.

Thus the preferred brake member has a bottom floor-engageable surface and a top wheel-engageable surface which is inclined upwardly and forwardly. This brake member is carried by a brake supporting member movably mounted on the truck body for substantial relative movement longitudinally of the truck between a forward position, in which the brake member is held in retracted position ahead of at least one wheel of the truck and a relatively rearwardly retracted or braking position in which the brake member is positioned beneath the wheel. The reference to relative rearward movement of the brake support member, in this specification, is designed to facilitate an understanding of the relative positions of the parts with respect to the truck body itself. It will be recognized, however, that in actual operation, the brake supporting member may actually be stationary, for example, when the front bumper first encounters an obstacle, while the main body portion of the truck will actually move forwardly under its own momentum after the brake-supporting member and front bumper have been stopped by the obstacle.

In any event, engagement of the front bumper with an obstacle effectively stops the forward movement of the relatively light portion of the truck assembly which constitutes the brake supporting member, without stopping the forward movement of the truck itself. The resulting over-run or forward movement of the truck then moves it into engagement with the brake member, so that the relative position of the brake member with respect to the truck body portion is a rearward braking position, as distinguished from a normal forward running position. The braking action, using the weight of the truck, can then stop the truck more effectively.

The forward momentum of the truck body portion is also used to lift the tow pin to non-driving position in response to relative movement of the wheel and truck onto the brake member. By application of the brake member to a wheel located near the tow pin, it is possible to lift the wheel, truck body and tow pin as a unit, by suitable dimensions of the brake member engaged beneath the wheel, so that the tow pin will just be disengaged from the usual tow line conveyor. Preferably, however, where the tow pin is at the front of such a truck, the brake member is applied to the rear wheels of the truck, and a suitable operative connection is provided between the tow pin and the brake support member for lifting the tow pin in response to forward movement of the truck relative to the brake support member, after the brake support member has come to a stop by engagement of the front bumper with an obstacle.

The front bumper of the tow truck system is movably mounted on the front of the brake support member, rather than directly on the truck itself, for movement between a normal forwardly projecting position and a rearwardly retracted position in response to engagement of the bumper with an obstacle. The bumper is further movable from retracted position to forwardly projecting position in response to removal or absence of an obstacle ahead of the truck.

The invention further provides an anti-back-up device for preventing premature rearward movement of the wheel and truck from the brake member onto which the wheel has run during the braking operation. Such anti-back-up device includes a one-way wheel-locking member, which is carried by a supporting means on the body portion for movement of the locking member between an operative position in which it engages the wheel and prevents reverse movement of the wheel and truck while permitting continued forward movement up onto the brake member, and an inoperative position in which the locking member is effectively out of engagement with the wheel. The position of the supporting means and locking member is effectively controlled by a positioning member movably mounted on the brake support member and operatively connected to the front bumper, so that the locking member is moved into effective position on the initial engagement of the front bumper with the obstacle, before the truck body and wheels over-run the brake support member to move onto the brake member. The operative connection between the front bumper and the anti-back-up device provides a conditionally stable linkage arrangement, such that there are no forces transmitted horizontally to the rotationally movable front bumper, due to the application of the anti-back-up device. The device is then easily released when the obstacle is removed from the front of the truck, and the front bumper moves slightly forwardly to its normal projecting position. The resulting release of the anti-back-up device permits the truck to roll backwardly down from the braking member. The resulting relative movement between the truck body and the brake support member, and the lowering of the truck from the brake member, thus permits re-engagement of the tow pin with the tow line conveyor to move the truck forwardly again. The desired relative movement of the brake support member and truck body to their normal operating positions is further encouraged or insured by the provision of resilient means connecting these two parts and normally urging the brake support member to its relative forward position with respect to the truck body. Thus the brake and its support will snap all the way forward, just as the wheels and truck move back off the brake.

For operation in tow line systems with powered spurs, this invention provides for a unique rear bumper combination which allows the forward truck in a row of accumulated (with brake engaged) trucks to move rearwardly to disengage its braking device, even though a following truck, with its braking member engaged, is in contact with the most rearward surface of the forward truck. For this purpose a rearward extension of the brake support member normally extends beyond the rearward surface of the main truck body (or frame). The distance of the rearward extension is such that when a following truck would engage a stopped (but not accumulated) leading truck, the fixed forward surface of the following truck will not contact the fixed rearward surface of the leading truck, but will be rearwardly spaced therefrom when the front end or bumper of the brake support member on the following truck engages the rearward extension of the brake support member on the leading truck. As a result of continuing forward movement of the following truck body, the tow pin of the following truck is fully disengaged and the wheels of the following truck run onto their brake members. Moreover, the fixed forward surface of the following truck will not engage the fixed rearward surface of the leading truck, even when the following truck is fully accumulated, i.e., with its tow pin fully disengaged, its wheels in full engagement with its brake, and the truck body brought to a stop. Thus the leading truck has space to move rearwardly off its brake members, when the obstacle in front of the leading truck is removed.

For operation in tow line systems with non-powered spurs, to the above noted construction is added a rearward-facing movable, but normally locked, extension of the rear surface of the main truck body. When push-off of the leading truck onto a non-powered spur is desired, the fixed forward surface of the following truck body will contact the normally locked movable extension of the rear surface of the leading truck body, before the forward extension or bumper of the brake support member of the following truck contacts the rear extension of the brake support member of the leading truck. Thus the following truck will push the leading truck without engagement of the braking system. For accumulation, and for subsequent disengagement of the brake members in a system that requires push-off capabilities, the movable extension of the rear surface of the leading truck body is unlocked at the proper time and is retractable forwardly (toward the truck body) to insure that the leading truck can move rearwardly, with respect to its brake support member, to disengage its brake member from the braking position between the floor and the truck wheels.

Thus, when the parts of the leading truck start to move into braking position, the movable rear bumper portion of the leading truck is effectively unlatched, so that the movable brake support member of a following truck can engage the brake support member of the leading truck, and so that the leading truck can later roll backwardly down from its brake member, even though the movable rear bumper portion of the leading truck should encounter a stationary portion of a following truck which has not yet been released from its braking position. To insure the desired action the movable rear bumper member is provided with resilient means normally urging it toward its first or rearwardly projecting position. It is also provided with locking means for selectively locking the bumper in either its rearward projecting position or in a relatively forwardly retracted or second position with respect to its truck body.

The operation of the locking means is controlled by interconnecting means which appropriately connect the brake support member and the locking means. Thus the locking means is normally positioned in a first position which resists forward retraction of the rear bumper and permits rearward extension of the rear bumper, while the brake support member is in its forward position relative to the truck body (i.e., before the truck body has over-run the brake support member in a forward direction). Conversely, when the brake support member is in its relative rearward position, which is the effective braking position of the truck, the locking means is selectively operated to a second position, to unlock the rear bumper in its projecting rearward position, and to permit forward retraction of the rear bumper relative to its body portion, while resisting rearward return movement of the bumper to its projecting position before leading truck moves away from the following truck in response to removal of the original obstacle.

The present invention, as described above, thus provides an improved truck and brake system which can provide the operating functions and advantages of prior systems in which an obstacle in front of a leading truck will stop that truck and successively stop or accumulate one or more following trucks, while alternately, a following truck can continue to push the leading truck if there is no obstacle in front of the leading truck. At the same time, the present invention offers the further operating and safety advantages of providing a reliable braking mechanism in which the forces transmitted to an obstacle in front of the truck are minimized, and the energy of movement of the truck itself is utilized to increase the efficiency of the braking mechanism and stop the truck itself, before substantial forces are applied by the truck to the obstacle.

BRIEF DESCRIPTION OF THE DRAWINGS

In the drawings which form a part of this application, and in which like reference characters indicate like parts.

FIG. 1 is a side elevation of a tow line conveyor truck embodying a brake system according to the invention, the parts being shown by heavy lines in their normal operating position and by dotted outline in their relative braking position;

FIG. 2 is a partial enlarged view similar to FIG. 1, which shows details of an anti-back-up device and its supporting and positioning mechanism, including details of a conditionally stable system for locking the supporting mechanism in a readily releasable operating position with all forces balanced in a self-contained manner with no further force requirement to keep the anti-back-up device in locking engagement with the wheel;

FIG. 3 is a bottom view of the truck of FIG. 1, with the parts in normal towing position;

FIG. 4 is a partial, enlarged top view showing details of the latching means for the movable rear bumper of the device of FIG. 3, with the parts in normal towing position;

FIG. 5 is a view similar to FIG. 4 showing the relative position of the rear bumper latching mechanism when the truck parts are in their relative braking position;

FIG. 6 is a schematic side view, showing the manner in which a following truck, driven by a tow line conveyor, can push a leading truck into an unobstructed siding or shunt path;

FIG. 7 is a view similar to FIG. 6, showing a leading truck after it has encountered an obstacle, with its parts in fully braking position, and with a following truck about to engage the blocked leading truck; and FIG. 8 is a partial schematic view similar to FIG. 7 showing the parts in heavy line position just after the following truck has also moved into full braking position, and further showing in dotted outline the manner in which the movable rear bumper can retract to permit rearward disengagement of the leading truck from its brake member when there is no longer an obstacle in front of the leading truck.

DESCRIPTION OF THE PREFERRED EMBODIMENTS

As shown in FIG. 1, a tow line conveyor truck 10 has a main body portion which includes a rectangular body frame 11, a plurality of underlying cross members 12 for attachment of various elements of the truck, and a load carrying deck 13 on the top of frame 11. Front and rear wheels 14 and 16 are mounted on the truck body beneath frame 11 by appropriate brackets connected to the cross members. Front wheels 14 are customarily mounted on caster brackets 18 which are adapted for pivotable movement on a vertical axis so that the front of the truck can readily follow the desired path determined by a tow line conveyor 19, which is usually mounted beneath the level of a floor 17 on which the truck is designed to operate. Overhead conveyor lines may be used, however in some cases.

Such a tow line conveyor 19 includes a plurality of pushing lugs 21 adapted for engagement with the lower end 22 of a tow pin 23 generally mounted at the front end of such a truck. In this case tow pin 23 is supported for relative vertical movement between a lower driving position in which end 22 can be pushed by lugs 21, and at least one upper nondriving position in which the tow pin end 23 will be spaced above conveyor lug 21, but still extend below the floor level 17 to maintain the truck in the desired path.

The upper end of tow pin 23 is pivotally connected at 24 to one lifting link 26 which has its lower end pivoted at 27 to a supporting link 28. The upper forward end of link 28 is pivoted at 29 to an appropriate bracket portion on frame 11. As shown in FIG. 1, swinging movement of the lower end of link 28 upwardly and rearwardly from the heavy line position of FIG. 1 to the dotted position at the right of the figure results in lifting of the tow pin to nondriving position as shown in dotted outline. The operative connection for causing such swinging movement of link 28 is described at a later point in this specification.

Truck 10 may include a vertical upwardly extending front panel or frame 31 to facilitate retention of a load on the truck bed 13, and to provide a support for the upper end of the tow pin and for any other desired truck elements.

According to a primary feature of the present invention, a brake member 33 is provided which has a lower or bottom surface 34 adapted for engagement with floor 17, and an upper or top surface 36 adapted for engagement beneath one of the wheels 14 and 16. In this case, the invention is illustrated with two such brake members 33 each mounted for cooperative action with the respective rear wheels 16. Brake members 33 are mounted on the truck body in such a manner that the brake is selectively movable relative to the truck body between a retracted position ahead of its wheel and a braking position beneath the wheel, i.e., between the wheel and the floor 17. The retracted position is shown in heavy lines in FIG. 1 and the braking position is shown in dotted lines, after the wheel 16 has had an opportunity to roll up onto the brake member 33 in a manner with constitutes an important feature of the present invention.

In order to provide for the relative desired movement of the brake member on the truck, the brake member is connected to a brake support member 41 which is mounted on the truck body for relative movement longitudinally of the truck body. The specific mounting connection shown in FIG. 1 includes a limited pivotal connection at 37 between the forward end of brake member 33 and the rear end of a brake support lever 38, which in turn is pivotally connected at 39 to the longitudinally movable brake support member 41. As shown in FIG. 3, there are two brake support levers 38, one at each side of the support member 41, for supporting the respective left and right brake members in front of the rear wheels 16.

Brake support member 41 is slidably mounted on the truck body by appropriate inner engagement with cross brackets 42 and 43 carried by the front of frame 11 and by the rear cross members 12. A stop 44 on brake support 41 limits the relative forward movement of the brake support with respect to the truck body, and a similar stop member 46 limits the relative rearward movement of brake support member 41 with respect to the truck body by engagement with supporting bracket 43 or other appropriate portions of the frame. Thus the brake support member 41 is mounted for relative longitudinal movement along the axis of the truck, i.e., along the direction of movement of the truck, between a relatively foward position (shown in heavy lines in FIG. 1), and a relative rear or braking position (shown in dotted lines in FIG. 1) in which the truck body has moved forwardly so that wheels 16 have moved up onto brake members 33 and, in effect, there has been relative movement between the truck body and brake support member 41 which brings the brake support member to a relatively retracted position rearwardly under the truck body 11.

To hold the brake members 33 off the floor 17 when the brake support member 41 is in its relative forward position, springs 47 hold the supporting levers 38 upwardly against suitable stops 48 on brake support member 41. In this position the rear ends of brake members 33 are spaced slightly above the floor, but are also projecting slightly betwen the peripheries of wheels 16 and the floor, so that the forward rolling motion of the wheels can push the brake members 33 downwardly into the dotted line position of FIG. 1, whenever the forward movement of the brake support member 41 is arrested, e.g., by an obstacle ahead of the truck.

The invention also provides resilient means, e.g., springs 49, normally urging brake support member 41, brake member 33 and associated parts forwardly on truck body 11 to the brake retracting position. Thus springs 49 are connected at their foward end to a cross frame member and at their rearward ends to the brake support levers 38 or the brake support member 41 itself. By connecting springs 49 to the brake support lever 38 in the manner shown in FIG. 1, however, springs 49 can perform a further function by exerting an over-center force, with respect to pivot point 39, which tends to hold brake support levers 38 in either the upper solid line position or the lower dotted line position of FIG. 1.

In order to stop the forward movement of brake support member 41 when the truck encounters an obstacle, the forward end of the brake support member 41 projects ahead of the truck as shown in FIG. 1 to support a front accumulating bumper. Thus when the front end of brake support 41 encounters an obstacle ahead of the truck, the forward movement of member 41 is resisted or stopped much more readily than the movement of the entire truck could be stopped, since the total mass of support member 41 and its associated parts is very much less than the mass of the truck body portion, particularly when there is a load on the truck. When forward movement of brake support member 41 is stopped in this manner, the inertia or energy of movement of the main truck body 11 and load on wheels 14 and 16 keeps the main truck body portion moving forwardly from the heavy line to the dotted line position of FIG. 1. Thus rear wheels 16 move onto brake members 33. The upper surfaces 36 of these brake members are inclined forwardly and upwardly with respect to the bottom surfaces 34, so that the truck wheels 16 must climb or be lifted up the surface of the brake member, thus lifting the weight of the corresponding portion of the truck and its load. This upward lifting action helps dissipate the energy of forward movement of the truck and tends to bring the truck to a stop at or before the point at which the truck has moved all the way forwardly relative to member 41 to the extent limited by stop member 46. If the truck has not come to a full stop by that point, then the weight of the truck and wheels 16 presses the brake members 33 firmly against the floor surface 17, so that brake members 33 must slide frictionally along the floor 17 and thus provide a final braking action. This braking action is more effective than the braking action of a brake applied only to the wheel itself, since the force required to maintain braking action on the wheel alone must be transmitted, through a suitable mechanism, from the obstacle. However, in the present invention the force utilized to cause braking is the weight of the truck itself, or more specifically, the force utilized to cause braking is that percentage of the weight of the truck which is transmitted through the wheel or wheels which engage the brake mechanism. Thus a brake member according to the present invention which is adapted for movement into a braking position between a truck wheel and the supporting floor has a definite advantage of utilizing the complete weight of the corresponding portion of the wheel and truck to increase the frictional braking forces. The braking force comes from the truck, not the obstacle.

Furthermore, from a safety standpoint, the provision of a substantial extent of relative longitudinal movement between the brake support member 41 and the truck body 11 offers definite safety advantages. Thus there is a substantial distance in which the truck and its load can, in effect, "overrun" the brake support member 41, after the later has been stopped by an obstacle, and before the truck itself reaches the obstacle. By proper selection of the relative extent of such longitudinal movement and the relative upward slope of the top 36 of brake member 33, the effective stopping distance, and the possible transmission of forces to the obstacle can be very substantially reduced, as compared to previously known constructions such as those in which an accumulating front bumper is mounted directly on the truck body and/or those in which the source of brake energy is the obstacle, i.e., which do not use the weight of the corresponding truck portion to achieve effective braking action. Moreover, the inter position of the brake member between the wheel and floor makes it possible to provide a brake member which has a lower surface 34 of such a nature that the coefficient of friction between such surface and floor 17 can be greater than the coefficient of friction between the periphery of the usual truck wheel 16 and the floor.

In the present invention, the tow pin of the truck is arranged so that it will be lifted to nondriving position with respect to the tow line conveyor, in response to relative movement of the truck and at least one of its wheels onto a brake member of the type described. For example, by location of a brake member 33 ahead of the front truck wheels 14, and by suitable selection of the upward slope at the top of such a brake member, the front of truck 10 and the tow pin 23 could be lifted as a unit just high enough to achieve the desired disengagement. In the preferred embodiment of FIG. 1, however, the brake mechanism is applied between the rear wheels and the floor, in order to facilitate mounting of the parts fully beneath the truck body, and another operative connection is provided between the movable brake member 41 and the tow pin 23 for lifting the tow pin in response to initial forward movement of the truck relative to the brake support member. For this purpose, the forward end of brake support 41 has two forwardly projecting side portions 51 at opposite sides of tow pin 23. These forwardly projecting extensions 51 provide pivotal bearings 52 for the front bumper member 53 which is normally held in the heavy line position of FIG. 1 by the weight of that portion of the bumper which is ahead of pivot point 52. A resilient member may also be provided to urge rotation of bumper member 53 to this position. The forwardly extending projections 51 also carry cam portions 54 projecting upwardly above member 41 as shown at 54 and 56. The forwardly and upwardly inclined cams 54 are designed for engagement by the supporting links 28 or cross pivot member 27 of the tow pin supporting linkage, when the truck body starts forwardly from the heavy line to the dotted line position in FIG. 1. The gentle cam angle of surface 54 rocks supporting link 23 so that parts 26 and 27 swing upwardly as shown at the right of the figure, with the parts resting on the flat supporting surface 56 at the top of the cam 54. Thus the forward movement of the truck body after the brake support member 41 has been stopped by engagement with an obstacle, is effectively harnessed to provide the lifting action for the tow pin 23. The tow pin will be held out of engagement in its nondriving position whenever the parts are in the dotted line position of FIG. 1, and the tow pin will be restored to driving position by its own weight, just as the relative positions of the truck body and brake support member have returned to the normal position shown in heavy lines in FIG. 1, so the truck can back off the brake before the tow pin is reengaged.

According to a further feature of the invention, an anti backup device is provided to prevent premature rearward movement of the wheel and truck from the brake member. For example, in the construction as described to this point, with an inclined upper surface on brake member 33, the moment the truck comes to a stop during rolling of wheels 16 upwardly on brake members 33, the weight of the truck and load on such wheels would tend to move the truck backwardly, so that the wheels would roll down to the rear off the brake members 33. This action might take place even though an obstacle was still located in front of the forward bumper 53. In such a case, the tow pin 23 could conceivably reengage another driving lug 21 on the conveyor 19 and urge the truck ahead, thereby repeating the previous braking action and applying additional, even though limited forces to the obstacle. In order to prevent undesired premature disengagement of the truck from brake member 33 prior to removal of an obstacle, the present invention further provides an anti-back-up device which is effectively controlled by the relative position of front bumper 53 on its pivot 52 at the front of brake support member 41. As shown in FIGS. 1 and 2, the anti-back-up device 57 includes a one-way wheel locking member 58 which is pivoted at 59 to a supporting arm 61 carried by a cross shaft 62 above rear wheels 16. Torsion spring 60 urges member 58 clockwise, so that its forward momentum, when the truck stops, will not throw it out of locking position. Cross shaft 62 is rotatably supported in suitable brackets 63 fixed to one of the body frame members. Shaft 62 extends entirely across the width of the truck, so that identical support arms 61 carry one-way locking members 58 at each side of the truck in operative relationship to the respective rear wheels 16. The rotary position of cross shaft 62, and the resulting position of locking members 58 is determined by a lever arm 64 projecting rearwardly from cross shaft 62. The lever 64 carries a roller 66 adapted to engage the upper surface of a positioning member 67 which is movably mounted on the brake support member 41 and which extends longitudinally above the top of member 41 all the way from the anti-back-up device to the front bumper 53. The forward end of positioning member 67 has two forwardly extending projections 68 which project forwardly on each side of tow pin 23 and have their forward ends pivotally connected at 69 to an upper bracket 71 on the rear surface of front bumper 53. Thus the front bumper serves as a supporting lever for the front end of positioning member 67. The rear end of member 67 is pivotally connected at 72 to a rear supporting link 73. Link 73 has its lower end pivoted at 74 to a rear portion of the brake support 41. The relative spacing of rear pivot points 72 and 74 and of front pivot points 71 and 52 provides a parallelogram linkage which effectively raises the positioning member 67 when the positioning member is moved rearwardly of brake support member 41 by rocking of front bumper 53 when it first engages an obstacle. Thus connecting link 73 is inclined forwardly and upwardly between the vertical and horizontal, when the front bumper is in projecting position, and is essentially vertical when the front bumper is rocked rearwardly to retracted position.

Lifting member 67 in this way from the heavy line position of FIGS. 1 and 2 to the dotted line position of those figures raises lever arm 64, rotates shaft 62 and thus moves the locking member supporting arms 61 downwardly in such a manner that the one-way locking members 58 can engage wheels 16 to prevent premature rearward rotation of the wheels and truck from the brake members 33. Thus locking members 58 have wheel engaging surfaces 76 which are angularly or spirally inclined with respect to the pivot points 59 to provide a one-way wedging or locking action against the periphery of wheels 16 when the parts are in the dotted line position of FIGS. 1 and 2. In this position, wheels 16 are still free to rotate in a forward direction, since such rotation, as viewed in these figures, will merely tend to rotate locking members 58 counter-clockwise or forwardly from the periphery of the wheel. When the forward motion of the truck stops, however, any tendency of the wheels 16 to roll backwardly down brake members 33 will be prevented by the wedging action of the one way locking member surfaces 76 as they tend to move clockwise and engage more firmly against the periphery of wheels 16. As noted above, the relative pivot point 52 and weight of front bumper member 53 tends to urge the bumper and the positioning member 67 to their forward or heavy line position in these figures. This effect can be reinforced, if desired, by the addition of a resilient spring connection 77 between a point 78 on brake support 41 and a point 79 on positioning member 67.

Thus the anti-backup device and its locking members 58 are normally held in inoperative position out of possible engagement with rear wheels 16 during regular operation of the truck. The moment front bumper member 53 encounters an obstacle, however, the first effect is to rock bumper 53 rearwardly, i.e., counterclockwise, around its pivot point 52, thus positioning the anti-backup device in effective operating position for one-way locking action to prevent premature rearward movement of wheels 16. The engagement of the obstacle against front bumper 53 then effectively stops the forward movement of brake support member 41 and permits over-running of the main truck body portion as previously described to engage wheels 16 on top of brake members 33 and stop the truck. The vertical position of link 73, when member 58 is in locking position, provides a balancing of vertical forces in a line, like a toggle in dead-center position, thus holding the parts in easily released locking engagement, without reguiring additional forces from member 67 to hold the lock in its conditionally stable anti-back-up position. Hence all forces are balanced along a given direction (e.g., a vertical one, in this case) in a self-contained manner, with no further force requirement (e.g., from an obstacle) to keep the anti-back-up brake device in locking engagement with the wheel.

To further prevent premature rearward movement of the truck, the upward slope of the top surface of brake member 33 should not be so steep that there is any likelihood of the wheel sliding back off the brake member while the anti-backup device is in locking position. On the other hand, the slope should be great enough to provide a positive lifting action to take advantage of the lifting of the weight of the truck as a means of increasing the dissipation of the truck's energy of forward movement. The exact angle can be varied within reasonable limits, depending on the truck speeds expected. In general, however, the forward and upward slope of the top of brake member 33 should not exceed about 20 degrees above the horizontal, and the preferred brake members presently contemplated involve an upward inclination of substantially 10 degrees above the horizontal.

Once the obstacle is removed from the front of the truck, front bumper 53 will swing forwardly to the heavy line position of FIG. 1, thus lowering the positioning member 67 and releasing the anti-backup device. Such release may be facilitated by the addition of a return spring 81 connected between the supporting arm 61 and the truck frame, to normally rotate shaft 62 in a counter-clockwise direction.

When the locking members 58 are released in this manner, the weight of the truck on wheels 16, and the inclination of upper surfaces 36 of the brake members 33, urges the truck wheels and truck body rearwardly.

This relative movement is further insured by the spring members 49, to restore the brake support member and truck body to their normal relative positions. Such relative movement last disengages cam portions 54 and 56 from the tow pin lifting linkage and permits the tow pin 23 to drop so that its lower end 22 will again be engaged and driven by a portion 21 of the conveyor 19.

Since trucks of the type described are normally used in systems in which a plurality of such trucks are moved along a given conveyor system, the present invention further provides means for insuring the necessary rearward movement of a leading truck and wheel from its brake member, in response to movement of its front bumper from retracted to projecting position, even though a following truck has engaged the rear of such truck and been similarly brought to a stop with its tow pin disengaged from the conveyor. The positioning member 67 just described, provides an operative connecting means between the front bumper and the antibackup device for releasing the lock as a first necessary step in insuring the desired relative rearward movement of the leading truck.

Where requirements permit, e.g., for operation in tow lines with powered spurs, the truck may be provided as described to this point, without the addition of any movable rear bumper 82 or its related mechanism as shown in FIGS. 1, 3, 4 and 5. In such an instance, whenever the front bumper 53 on brake support member 41 of the following truck 10A engages the rearward brake support extension 113 of the forward truck 10, braking action will be initiated on truck 10A regardless of the position of the rear extension of the brake support member 113 on the forward truck 10. Moreover, the following truck 10A will overrun its brake support member no farther than the cooperating stop means 46 permits, and the forward fixed surface 83 of truck 10A will still be spaced far enough from the rear fixed edge or surface 85 of truck 10 to permit rearward movement of truck 10 from its brakes 33, when its anti-back-up device is released by removal of the obstacle in front of leading truck 10. FIG. 8 illustrates this rearward movement of the leading truck from heavy line to dotted line position, and this movement is essentially the same, whether movable rear bumper 82 (described below) is omitted (as just discussed) or included (as shown in FIG. 8.)

For certain installations, for example where one desires to push-off a leading truck onto a non-powered spur, the truck is provided with a movable rear body or rear bumper portion 82 which normally projects rigidly to the rear of the truck as shown in FIGS. 1 and 3 for convenient pushing engagement by a fixed front portion or bumper 83 of a following truck (see also FIG. 6). The construction of such a movable rear bumper includes mechanism for locking it selectively in either its normal rearwardly projecting position or in a forwardly retracted position.

Thus the rear bumper 82 is carried at the rear end of a longitudinally extending supporting rod 84, which is supported and guided in suitable openings in the rear cross frame member 86. Additional guide rods 87 and 88 similarly slide through openings in frame member 86 for additional stability. The forward end 89 of supporting rod 84 extends through a further supporting bracket 91 which forms part of the supporting bracket for the desired locking mechanism. A spring member 92 is mounted on rod 84 between bracket 91 and a flange 93 on the rod. Hence the spring tends to push flange 93, rod 84 and bumper 82 toward the rear of the truck, until flange 93 or another suitable stop member engages one of the cross frame members, e.g., at 94. Thus spring 92 serves as a resilient means urging the rear bumper at all times toward its normal or first position, i.e., its rearwardly projecting position. A locking means is provided to selectively lock the bumper in either this first or normal position, or a second position in which the bumper member 82 is retracted to the right in FIGS. 1 and 3, against the urging of spring 92, to permit rearward movement of the truck back off the brake members 33. This selective locking means includes a supporting flange 96 extending longitudinally next to rod 84 and provided with openings 97 and 98 for anchoring corresponding ends of suitable lock washers 99 and 101. As shown in the enlarged view of FIG. 4, when the parts are in the normal operating position of FIGS. 1 and 3, an upwardly projecting control post 103 engages the rearward surface of the unanchored end 102 of lock washer 101. Member 103 is rigidly secured to the movable brake support member 41 and projects upwardly from it and holds washer 101 in the position shown in FIG. 4 against the resilient urging of a spring 105. Spring 105 connects the corresponding unanchored ends of washers 99 and 101 and tend to pull those ends together at all times. Since member 103 prevents rearward moevement of the end 102 of washer 101, this washer is held in a position substantially perpendicular to the axis of rod 84, so that the edges of a central opening in washer 101, which surrounds the rod 84, will exert no binding action whatsoever on the rod 84. In this position, spring 105 pulls the unanchored ends of lock washers 99 forwardly as shown in FIG. 4, so that the edges of the central openings of these lock washers are inclined into binding engagement with rod 84. Thus, as a result of the aforesaid arrangement, any movement of rod 84 and rear bumper 82 toward the front of the truck (i.e., to the right in FIG. 4) is resisted by the binding action of the lock washers 99.

These lock washers 99 have their free ends further connected by another spring 106 to the upper end 107 of an additional control post 108 which is also rigidly secured to the movable brake support member 41. The relative location of point 107, and the resilience of spring 106 are so selected that when the parts are in the position of FIG. 4, spring 106 will be loose, and spring 105 will hold washers 99 at an angle, thus insuring the desired locking action just described. When the truck encounters an obstacle, however, the brake support member 41 is brought to a stop and the rest of the truck moves relatively to the right to the dotted line position of FIG. 1. Thus the bracket portions 91 and 96 and the lock washers 99 and 101 are all carried to the right, while the control posts 103 and 107 effectively remain stationary (i.e., move relatively to the left) as shown in FIG. 5. In this position, control post 103 has been moved away from washer 101 so that spring 105 can rock the free end 102 of that washer toward the rear of the truck to the position of FIG. 5. The relative movement of control post 107 tensions spring 106, so that this spring pulls the lock washers 99 to the rear until their free ends engage a stop portion 111 on bracket 91. In this position the lock washers 99 are substantially perpendicular to the axis of rod 84, so that these lock washers have no effect on the possible movement of shaft 84 in either direction. The inclination of lock washer 101 in FIG. 5, however, permits movement of shaft 84 to the right, and thus permits retraction of rear bumper 82 as the truck moves rearwardly off its brake members 33. Washer 101 locks the rod 84 in whatever position it reaches toward the right of FIG. 5, without permitting reextension of the rod 84 and the bumper to the rear of the truck, as long as the locking washers remain in the FIG. 5 position. The parts remain in this position, until the obstacle has been removed from the front of the truck, and until the truck body has moved relatively rearwardly from the brake members 33 within 1 inch of the relative normal operating positions of the brake support member 41 and truck body 11, as shown in the solid line FIG. 1 positions. At this point the latching mechanism is restored to the position shown in FIG. 4 for normal operation, but only after the brake is free of the wheel.

The operation of the improved truck and brake system described above will be further apparent from FIGS. 6, 7 and 8. FIG. 6 shows the manner in which two trucks of the type shown in FIGS. 1 and 3 can cooperate, when the rear truck is engaged with the tow line conveyor and the front truck is being pushed onto a shunt line where there is no power applied to pull the leading truck away from the following truck. In this situation the latching mechanism is in the position shown in FIG. 4, the rear bumper 82 is held rigidly to the rear, and the rigid portion 83 at the front of the following truck pushes the leading truck as long as no obstacle is encountered by that truck.

FIG. 7 illustrates a situation when a leading truck has encountered an obstacle and the parts of the leading truck have moved to the relative braking position corresponding to the dotted line position of FIG. 1. In FIG. 7, a following truck 10A, which is still in driving engagement with the tow line, is about to engage the stopped leading truck 10. In order to achieve the advantage of the present invention for stopping the following truck, the brake support member 41 of each truck projects rearwardly as shown at 113 to provide a point of engagement for the pivoted bumper 53 on brake support member 41 of the following truck, before the fixed front portion 83 of the following truck can engage the normally projecting rear bumper portion 82 of the leading truck. Thus only the brake support member 41 of the following truck and its associated parts will exert any additional forward force through the brake support member 41 of the leading truck and its bumper 53 against obstacle 112. The body and wheels of the following truck will then continue to move to the right from the position shown in FIG. 7, until its rear wheels are fully engaged on its brake members 33 to stop the following truck in the same manner in which the leading truck was previously stopped, i.e., with maximum braking action and maximum dissipation of the energy of movement of the truck prior to the point at which any forces are transmitted by the truck itself to the leading truck and/or to the obstacle in front of the leading truck.

FIG. 8 illustrates the manner in which the movable rear bumper 82 of the leading truck can be retracted or pushed forwardly when the leading truck is unblocked and is ready to roll backwardly from its brake member 33. At this time the leading truck will move from the relative position shown in heavy lines in FIG.

8 back to the dotted line position, and this rearward movement of the truck and its wheels will be permitted and insured by the fact that the locking washers are in the position of FIG. 5 in which the rear bumper 82 is free to move forwardly relative to the rearwardly moving truck, whenever that bumper portion 82 encounters the fixed leading portion of a following truck. At this time the following truck is still in its full braking position and is therefore not free to move to the rear, since its anti-back-up device will remain in effective operating position until the front bumper 53 of the following truck is permitted to rock forwardly again. This will only occur after the leading truck has moved completely off its brake member 33, so that the tow pin of the leading truck can again be engaged by the tow line conveyor to pull the leading truck forwardly away from the following truck.

In practicing the present invention, the specific selection and relative arrangement of parts can be varied to meet the particular requirements of different installations. In all cases, however, the brake support means, such as the longitudinally movable brake support member, should provide for a substantial distance over which the truck body and wheels can continue to move forwardly, after the front bumper has encountered an obstacle. Thus the force applied by or to the obstacle will be minimized and will be limited to that which is necessary to stop the bumper itself and its directly connected parts, such as the brake support means. The truck can then over-run the stationary bumper and parts, and the wheels can run up onto the brake members, so that the weight of the truck supplies an important part of the braking force to stop the truck in a shorter distance, i.e., before the full energy of the moving truck can be transferred to the obstacle.

The longer the extent of relative longitudinal movement between the truck and the brake support, for example, the safer the braking mechanism will be. The required stopping distance is a function of velocity and of any vertical distance through which a given part of the truck is lifted to help dissipate its forward energy of movement. A greater degree of relative movement between brake support and truck, however, increases the total length of the truck and associated parts. Thus the selection of a particular length of relative movement, and a particular vertical lift for the brake member, involves some compromise. A relative movement of 7½ inches, and a brake dimension lifting a truck wheel approximately 1/10 of a foot for each 100 feet per minute of expected tow conveyor velocity are presently recommended as a practical working design. Also, the upward slope of the top surfaces of the brake members 33 should in any event be at an angle to the horizontal, which is small enough to prevent rearward sliding of the locked wheels, while the anti-back-up device is in locking position.

The tow line truck and brake system described in the foregoing specification is believed to offer significant advantages in both safety and flexibility of operation, which have not been capable of achievement by previously known devices. The specification sets forth some of the ways in which the invention may be practiced, including the best mode presently contemplated for carrying out the invention. Other modifications and variations may be apparent to those skilled in the art, in the light of the foregoing description and the following claims.

I claim:

1. In a tow line conveyor truck having a load-carrying body portion, front and rear wheels mounted on said body portion for engaging a supporting floor on which the truck is to move, and a tow pin for driving engagement with a tow line conveyor to move the truck along a desired path, the improvement comprising at least one brake member having a bottom-floor-engageable surface and a top wheel-engageable surface, brake support means on said truck supporting the brake member in front of at least one of said wheels for relative movement of the brake member between a retracted position ahead of said wheel and a braking position in which the brake member is engaged beneath said wheel, and control means for causing relative movement of the brake member rearwardly of the truck from its retracted position to a position in which said truck wheels rolls onto the brake member and at least part of the weight of the truck is applied to hold the brake member in braking position between the wheel and floor.

2. A tow line conveyor truck according to claim 1 in which the top wheel-engageable surface of the brake member is inclined upwardly and forwardly, thereby lifting said wheel and the corresponding truck and load portions and automatically dissipating part of the energy of their forward movement, in response to upward movement of the truck and wheel onto the brake member.

3. A tow line conveyor truck according to claim 2, having an anti-back-up device preventing premature rearward movement of the wheel and truck from the brake member.

4. A tow line conveyor truck according to claim 3 in which the anti-back-up device includes a one-way wheel-locking member, a wheel-locking member supporting means mounted on said body portion for movement between an operative position, in which the wheel-locking member is held in engagement with said wheel and prevents reverse movement thereof while permitting forward movement of the wheel onto the brake member, and an inoperative position, in which the wheel-locking member is held out of engagement with said wheel, and said control means includes a front bumper movably mounted on the truck for movement between a normal forwardly projecting position and a relatively retracted position in response to initial engagement of the bumper against an obstacle in the path of the truck and also includes means interconnecting the front bumper and brake support means for causing the relative movement of the brake member into braking position when the front bumper has engaged such obstacle, said control means further including positioning means operatively connecting said front bumper and supporting means for moving said supporting means and wheel-locking member from inoperative to operative position on initial movement of the front bumper from projecting toward retracted position.

5. A tow line conveyor truck according to claim 4 having means automatically moving the front bumper from retracted to projecting position on removal of such obstacle, and also having means providing rearward movement of the body portion and wheel from said brake member in response to the movement of the front bumper to projecting position, said last-mentioned means including the positioning means, in which the positioning means is connected for automatic movement of the supporting means and one-way wheel-locking member to inoperative position in response to movement of the front bumper to project position.

6. A tow line conveyor truck according to claim 5 having a movable rear bumper, means supporting the rear bumper on the body portion for relative movement between a first rearwardly projecting position and a second forwardly retracted position, resilient means normally urging the rear bumper toward its first position, first locking means for normally locking the rear bumper against movement from its first position toward its second position while the brake member is in retracted position, and means operatively interconnecting said first locking means and brake member for releasing the locking means and permitting movement of the rear bumper toward its retracted second position while the brake member is in braking position and until the brake fully returns to retracted position.

7. A tow line conveyor truck according to claim 1 in which the brake support means on said truck is longitudinallly relatively movable with respect to said truck body portion, said control means includes a movable front bumper supported on said truck and interconnected with said longitudinally movable brake support means and responsive to engagement of the bumper with an obstacle for causing said relative movement of the brake member rearwardly to a braking position in which said truck wheel rolls substantially entirely onto the brake member and at least that part of the weight of the truck carried by said wheel presses the brake member firmly against such supporting floor.

8. A tow line conveyor truck according to claim 7 also having an anti-back-up device preventing premature rearward movement of the wheel and truck relative to the brake member and brake support means, and means releasing said anti-back-up device in response to removal of the obstacle from engagement with said front bumper.

9. A tow line conveyor truck having a load-carrying body portion, front and rear wheels mounted on said body portion for engaging a supporting floor on which the truck is to move along a desired path, a brake support member extending longitudinally of said truck, means on the body portion supporting the brake support member for relative longitudinal movement with respect to the body portion between a first relatively forward position and a second relatively rearward position spaced longitudinally and rearwardly from the first position, cooperating stop means on the body portion and brake support member for limiting the relative longitudinal movement and defining said first and second relative positions, spring means normally and resiliently urging the brake support member from its second position toward its first position, a front bumper on the front of the brake support member for engagement with an obstacle ahead of the truck to stop the forward movement of the bumper and brake support member without stopping the forward movement of the body portion, and a brake member mounted on said brake support member at a location providing effective braking engagement of the brake member between the floor and at least one of said wheels during and in response to continuing forward movement of the body portion and wheels relative to the brake support member and brake member after the bumper on the brake support member has engaged such an obstacle, thereby applying at least part of the truck weight vertically down against the brake member for substantially reducing the velocity of the truck before it has reached its second relative position and transmitted forces directly from the body portion to such obstacle through said cooperating stop means, brake support member and front bumper.

10. A tow line conveyor truck according to claim 9 in which the brake member is positioned ahead of said one wheel at a location providing for movement of the wheel onto the brake member during the continuing forward movement of the body portion and wheels, thereby applying at least part of the weight of the truck to hold the brake member in locking position between the wheel and floor.

11. A tow line conveyor truck according to claim 10 in which the brake member has an upper wheel-engaging surface inclined upwardly and forwardly for lifting the wheel and corresponding body portion in response to the continuing forward movement of the body portion and wheel along said upper surface, said body portion having a tow pin for driving engagement with a tow line conveyor to move the truck along the desired path, and said tow pin being lifted out of driving engagement with such a conveyor in response to initial relative forward movement of said wheel and body portion with respect to the brake support member and brake member.

12. A tow line conveyor truck according to claim 11 in which the brake support member and tow pin have operatively interconnecting cam means lifting the tow pin out of driving engagement during the initial relative forward movement of the body portion immediately after the forward movement of the brake support member has been stopped by engagement of the front bumper with an obstacle.

13. A tow line conveyor truck according to claim 12 having an anti-back-up device preventing premature rearward movement of the wheel and truck from the brake member, the anti-back-up device including a one-way wheel-locking member, a wheel-locking member supporting means mounted on said body portion for movement between an operative position, in which the wheel-locking member is held in engagement with said wheel and prevents reverse movement thereof while permitting forward movement of the wheel onto the brake member, and an inoperative position, in which the wheel-locking member is held out of engagement with said wheel, said front bumper being movably mounted on the brake support for movement between a normal forwardly projecting position and a relatively retracted position in response to initial engagement of the bumper against an obstacle in the path of the truck, and said truck also having positioning means operatively connecting said front bumper and supporting means for moving said supporting means and wheel-locking member from inoperative to operative position on initial movement of the front bumper from projecting toward retracted position.

14. A tow line conveyor truck according to claim 13 in which the positioning means includes a horizontal support member having one end connected to the brake support member by an angularly movable connecting link, and its other end connected to the front bumper for longitudinal relative movement of the support member in response to movement of the front bumper between projecting and retracted positions, the connecting link being inclined between the vertical and horizontal when the front bumper is in projecting position and being substantially vertical when the front bumper is in retracted position, and said wheel-locking member supporting means having a vertically movable portion engaging the horizontal support member near said connecting link, and being lifted to wheel-locking position in response to lifting of the support member when the link swings to vertical position.

15. A tow line conveyor truck according to claim 14 having means automatically moving the front bumper from retracted to projecting position on removal of such obstacle, and also having means providing rearward movement of the body portion and wheel from said brake member in response to the movement of the front bumper to projecting position, said last-mentioned means including the support member, in which the support member is connected to the bumper for automatic movement of the supporting means and one-way wheel-locking member to inoperative position in response to final movement of the front bumper to projecting position.

16. A tow line conveyor truck according to claim 15 having a movable rear bumper, means supporting the rear bumper on the body portion for relative movement between a first rearwardly projecting position and a second forwardly retracted position, resilient means normally urging the rear bumper toward its first position, first locking means for normally locking the rear bumper against movement from its first position toward its second position while the brake support member is in its relative forward position on the body portion, and means operatively interconnecting said first locking means and brake support member for releasing the locking means and permitting movement of the rear bumper toward its retracted second position while the brake support member is in its relative rearward position and until the brake support member fully returns to its relative forward position.

17. A tow line conveyor truck according to claim 16 having second locking means for locking the rear bumper against return movement from its second position toward its first position while the brake support member is relatively displaced from its relative forward position on the body portion, and means operatively interconnecting said second locking means and brake support member for releasing the second locking means and permitting movement of the rear bumper toward its rearwardly projecting position in response to complete relative return movement of the brake support member to its relative forward position.

* * * * *